US012744818B2

(12) United States Patent
Shulman et al.

(10) Patent No.: US 12,744,818 B2
(45) Date of Patent: Sep. 22, 2026

(54) IDENTIFYING SERVERLESS FUNCTIONS WITH OVER-PERMISSIVE ROLES

(71) Applicant: Palo Alto Networks, Inc., Santa Clara, CA (US)

(72) Inventors: Avraham Shulman, Tel Aviv (IL); Ory Segal, Tel Aviv (IL); Shaked Yosef Zin, Tel Aviv-Jaffa (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 155 days.

(21) Appl. No.: 18/651,470

(22) Filed: Apr. 30, 2024

(65) Prior Publication Data

US 2024/0291868 A1 Aug. 29, 2024

Related U.S. Application Data

(63) Continuation of application No. 16/024,863, filed on Jul. 1, 2018, now Pat. No. 12,003,541.

(60) Provisional application No. 62/528,244, filed on Jul. 3, 2017, provisional application No. 62/528,235, filed on Jul. 3, 2017.

(51) Int. Cl.
*H04L 29/06* (2006.01)
*H04L 9/40* (2022.01)

(52) U.S. Cl.
CPC .......... *H04L 63/20* (2013.01); *H04L 63/1433* (2013.01); *H04L 63/107* (2013.01)

(58) Field of Classification Search
CPC .... H04L 63/20; H04L 63/1433; H04L 63/107
See application file for complete search history.

(56) References Cited

U.S. PATENT DOCUMENTS

| | | | |
|---|---|---|---|
| 7,113,994 | B1 | 9/2006 | Swift et al. |
| 7,912,971 | B1 | 3/2011 | Dunn |
| 8,024,186 | B1 | 9/2011 | De Bonet |
| 8,474,018 | B2 | 6/2013 | Mardikar et al. |
| 10,255,422 | B1 | 4/2019 | Last et al. |
| 10,430,727 | B1 | 10/2019 | Fusillo et al. |

(Continued)

OTHER PUBLICATIONS

Baldini, et al., "The Serverless Trilemma: Function Composition for Serverless Computing", Onward! The 2017 ACM SIGPLAN International Symposium on New Ideas, New Paradigms, and Reflections on programming and Software, Vancouver BC Canada, Oct. 25-27, 2017, pp. 89-103.

(Continued)

*Primary Examiner* — Wasika Nipa
(74) *Attorney, Agent, or Firm* — Gilliam IP PLLC

(57) ABSTRACT

Based on analyzing a serverless function associated with a first role, a set of security permissions granted to the serverless function is identified based on the first role and a first attribute of the serverless function. A least privilege role indicating a set of least privilege security permissions for the serverless function is generated based, at least in part, on the first attribute. Based on comparing the least privilege role with the first role, it is determined if the set of security permissions granted to the serverless function is more permissive than the set of least privilege security permissions. Based on determining that the set of security permissions granted to the serverless function is more permissive than the set of least privilege security permissions, the first role is reported as over-permissive.

20 Claims, 4 Drawing Sheets

(56) References Cited

U.S. PATENT DOCUMENTS 10,649,861 B1 5/2020 Natanzon et al.
10,715,542 B1 7/2020 Wei et al.
10,771,468 B1 9/2020 Walker et al.
10,782,934 B1 9/2020 Chawda et al.
10,860,433 B1 12/2020 Lieberman et al.
11,144,513 B1 10/2021 Padisetty et al.
2004/0168082 A1 8/2004 Foster et al.
2005/0108678 A1 5/2005 Goodwin et al.
2006/0288404 A1 12/2006 Kirshnan et al.
2008/0127292 A1 5/2008 Cooper et al.
2008/0313716 A1 12/2008 Park
2009/0177721 A1 7/2009 Mimatsu et al.
2009/0222894 A1 9/2009 Kenny et al.
2009/0249063 A1 10/2009 Sakurai et al.
2011/0055918 A1 3/2011 Keefe et al.
2011/0162046 A1 6/2011 Forster et al.
2012/0060142 A1 3/2012 Fliess et al.
2012/0102539 A1 4/2012 Robb et al.
2012/0259877 A1 10/2012 Raghunathan et al.
2012/0324540 A1 12/2012 Wu
2013/0133024 A1 5/2013 Macleod et al.
2013/0219372 A1 8/2013 Li et al.
2014/0282889 A1 9/2014 Ishaya et al.
2014/0359692 A1* 12/2014 Chari .................... G06F 21/31 726/1
2014/0359695 A1 12/2014 Chari et al.
2015/0095968 A1 4/2015 Steiner et al.
2017/0295181 A1 10/2017 Parimi et al.
2018/0113793 A1 4/2018 Fink et al.
2018/0115551 A1* 4/2018 Cole .................. H04L 41/0895
2018/0121659 A1 5/2018 Sawhney et al.
2018/0173806 A1 6/2018 Forstmann et al.
2018/0227323 A1 8/2018 Jevans et al.
2018/0255102 A1 9/2018 Ward
2018/0302277 A1 10/2018 Shimamura
2019/0007458 A1 1/2019 Shulman et al.
2019/0014171 A1 1/2019 Stein et al.
2019/0028552 A1 1/2019 Johnson, II
2019/0079744 A1 3/2019 Bosch
2019/0188049 A1 6/2019 Choudhary et al.
2019/0205186 A1 7/2019 Zhang et al.
2019/0332366 A1 10/2019 Natanzon et al.
2019/0332781 A1 10/2019 Natanzon
2019/0334886 A1 10/2019 Lelcuk et al.
2019/0334905 A1 10/2019 Lelcuk et al.
2019/0384726 A1 12/2019 Murphy
2019/0384912 A1 12/2019 Branson et al.

OTHER PUBLICATIONS

Hall, et al., "An Execution Model for Severless Functions at the Edge", IoTDI '19: International Conference on Internet of Things Design and Implementation, Montreal QC Canada, retrieved on Apr. 17, 2020 from https://www.cc.gatech.edu/projects/up/publications/iotdi19-AdamHall.pdf, Apr. 15-18, 2019, pp. 225-236.

* cited by examiner

IDENTIFYING SERVERLESS FUNCTIONS WITH OVER-PERMISSIVE ROLES

TECHNICAL FIELD

The disclosure relates generally to cyber-security systems and, more specifically, to techniques for securing serverless functions.

BACKGROUND

Organizations have increasingly adapted their applications to be run from multiple cloud computing platforms. Some leading public cloud service providers include Amazon®, Microsoft®, Google®, and the like. To ensure their services are not interrupted, these service providers must protect their customers against cyber security threats.

In cloud computing platforms, serverless computing is a new emerging technology that provides a cloud computing execution model in which the cloud provider dynamically manages the allocation of machine resources. Such platforms, also referred to as function as a service (FaaS) platforms, allow executing application logic but do not store data. Commercially available platforms include AWS Lambda by Amazon®, Azure® Functions by Microsoft®, Google Cloud Functions Cloud Platform by Google®, Cloud Functions by IBM®, and the like.

Serverless computing is a misnomer, as servers are still employed. The name "serverless computing" is used to indicate that the server management and capacity planning decisions are completely hidden from the developer or operator. Serverless code can be used in conjunction with code deployed in traditional styles, such as microservices. Alternatively, applications can be written to be purely serverless and use no provisioned services at all.

Further, FaaS platforms do not require coding to a specific framework or library. FaaS functions are regular applications when it comes to programming language and environment. Typically, functions in FaaS platforms are triggered by event types defined by the cloud provider. Functions can also be triggered by the manually configured events or when a function calls another function. For example, in Amazon® AWS®, such triggers include file (S3) updates, time (e.g., scheduled tasks), and messages added to a message bus. A programmer of the function would typically have to provide parameters specific to the event source it is tied to.

A serverless function is typically programmed and deployed using command line interface (CLI) tools, an example of which is a serverless framework. In most cases, the deployment is automatic and the function's code is merely uploaded to the FaaS platform. A serverless function can be written in different programming languages, such as JavaScript, Python, Java, and the like. A function typically includes a handler (e.g., handler.js) and third-party libraries accessed by the code of the function. A serverless function also requires a framework file as part of its configuration. Such a file (e.g., serverless.yml) defines at least events that trigger the function and resources to be utilized, deployed or accessed by the function (e.g., database).

With their computing advantages, serverless functions are also vulnerable to some cyber threats. Such vulnerabilities are not due to infrastructure, but rather to the exploiting of function's code itself. For example, application level vulnerabilities (e.g., cross-site scripting, SQL Injection), may continue to be severe if exploited due to improper programming of the function.

As yet another example, serverless functions also include application dependencies, such as Node.js, PyPI (Python), Maven (Java) or other relevant platforms. Attackers have already exploited vulnerable application dependencies and will likely continue to do so, including within FaaS platforms.

As yet another example, data at rest, which is accessible through serverless functions, can also be exploited by attackers. If an attacker gains access to the data through, for instance, leaked credentials, a compromised insider, or by any other means, serverless functions are not programmed to stop or detect such an attempt.

Since the FaaS and serverless functions have been recently introduced, not many attacks have been detected targeting their vulnerabilities. However, it is expected that the popularity of FaaS will move attackers' focus from targeting servers and infrastructure to targeting services and functions. Since current cyber-security solutions are designed to protect servers and infrastructure, they are ill equipped to efficiently handle vulnerabilities in serverless functions.

It would therefore be advantageous to provide a solution for detecting and securing serverless functions from attacks that would overcome the challenges noted above.

SUMMARY

According to the present invention there is provided a method for protecting a serverless function, the method including: (a) analyzing the serverless function to identify a strict set of security permissions required by the serverless function in order to interact with a computing environment as intended.

According to further features in preferred embodiments of the invention described below the method further includes: (b) generating a security policy, the security policy including the strict set of security permissions. According to still further features in the described preferred embodiments the method further includes (c) applying the security policy to the serverless function.

According to further features the method includes: (b) comparing security permissions granted to the serverless function with the strict set of security permissions. According to further features the method further includes: (c) generating an alert when the security permissions are overly privileged relative to the strict set of security permissions.

According to further features the method further includes: (c) preventing building or deployment of the serverless function when the security permissions are overly privileged relative to the strict set of security permissions.

According to further features the method further includes: (c) preventing or stopping execution of the serverless function when the security permissions are overly privileged relative to the strict set of security permissions.

According to further features the strict set of security permissions relates to at least one of: a region, an account, a service, and a resource called or accessed by the serverless function.

According to another embodiment there is provided a method for protecting a serverless function, the method including: (a) analyzing the serverless function to identify security vulnerabilities or insecure configurations in the serverless function. According to further features the security vulnerabilities include known vulnerabilities in 3rd party libraries. According to further features the security vulnerabilities include sensitive information insecurely stored in code or configurations of the serverless function.

According to further features the security vulnerabilities are selected from the group including: over privileged roles, weak encryption, improper exception handling, potential data leakage sources, insecure third-party service usage.

According to further features the method further includes: (b) generating an alert when the security vulnerabilities or insecure configurations are identified in the serverless function. According to features the method further includes: (b) preventing building or deployment of the serverless function when the security vulnerabilities or insecure configurations are identified in the serverless function. According to further features the method further includes: (b) preventing or stopping execution of the serverless function when the security vulnerabilities or insecure configurations are identified in the serverless function.

BRIEF DESCRIPTION OF THE DRAWINGS

The foregoing and other objects, features, and advantages of the disclosed embodiments will be apparent from the following detailed description taken in conjunction with the accompanying drawings.

DESCRIPTION

Figure 1:
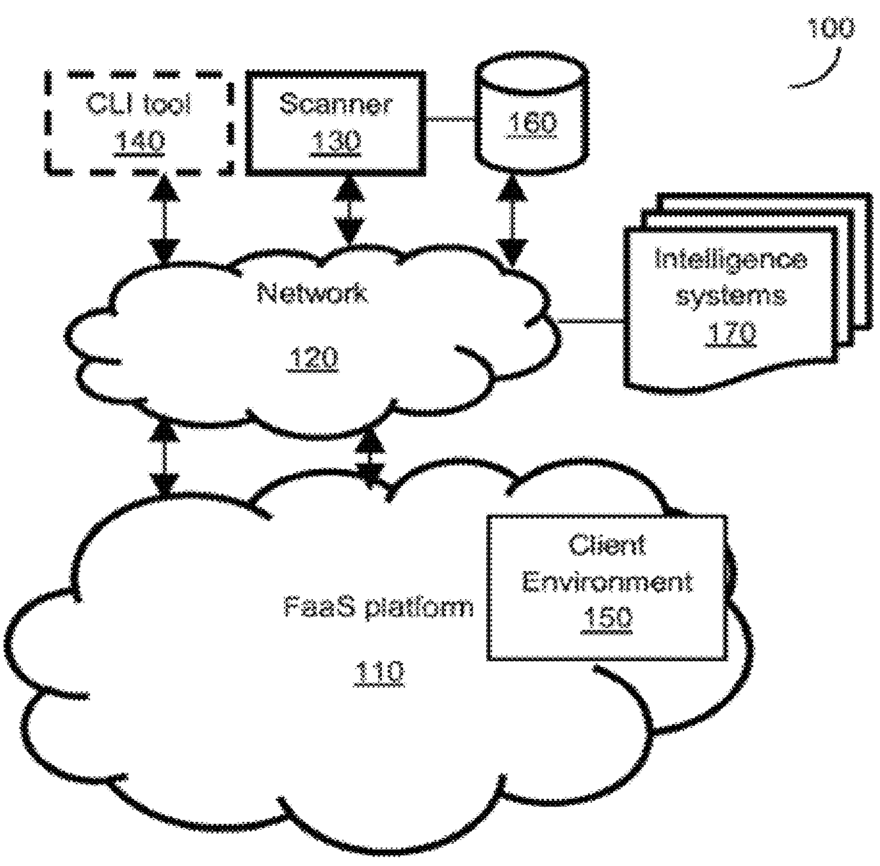
FIG. 1 is a network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various embodiments. A cloud computing platform, operating as a FaaS platform 110, is communicably connected to a network 120. Examples of the FaaS platform 110 include, but are not limited to, AWS Lambda by Amazon®, Azure® functions by Microsoft Azure®, Google Cloud Functions Cloud Platform offers by Google®, Cloud Functions by IBM®, and the like. The network 120 may be the Internet, the world-wide-web (WWW), a local area network (LAN), a wide area network (WAN), and other networks. Usually a FaaS platform in cloud providers' environment is the compute service, while when referring to serverless, the meaning is the usually the combination of the compute service and the SaaS services that can interact with the FaaS platform. While all the methods, examples and descriptions herein refer to public cloud FaaS platforms, it is made clear that these methods, examples and descriptions apply equally to all serverless implementations such as but not limited to: serverless functions on IoT (internet of things) devices (such as AWS Greengrass®, Azure Functions on IoT Edge™), serverless on edge (e.g. AWS Lambda@Edge™, CloudFlare Workers, etc.) and all other serverless architectures (such as OpenFaaS, Nuclio, Fission, Oracle FN, etc.)

Also connected to the network 120 is a vulnerability scanner 130 configured to perform the various disclosed embodiments. In one embodiment, the scanner 130 is configured to interface with at least a CLI tool 140 that provides a framework for developing and deploying serverless functions. Examples of a CLI tool 140 may include Serverless Framework, AWS CloudFormation, and the like. In other embodiments, the scanner may interface directly with the serverless platform. In an example embodiment, the interface between the scanner 130 and the CLI tool 140 may be realized as an API or a plugin.

The vulnerability scanner 130 may further interface with the FaaS platform 110 and a client environment 150 within the platform 110, and a database 160 for storing at least results from previous scans, and one or more intelligence systems 170. The intelligence systems 170 may include common vulnerabilities and exposures (CVE®) databases, reputation services, security systems (providing feeds on discovered threats), and so on. The information provided by the intelligence systems 170 is utilized to detect certain known vulnerabilities related to at least application dependencies.

The client environment 150 is an environment within the cloud computing platform utilized to execute cloud-hosted applications of the client. A client may belong to a specific tenant. The interface between the client environment 150 and the scanner 130 can be realized using APIs or services provided by the cloud computing platform. For example, in AWS, a cross account policy service can be utilized to allow interfacing the client environment 150 with the scanner 130.

According to the disclosed embodiments, the vulnerability scanner 130 is configured to analyze the serverless function to identify a strict set of security permissions required by the serverless function in order to interact with a computing environment as intended. The scanner can be implemented in a multitude of ways on a multitude of serverless platforms and infrastructures. Examples of implementation include, but are not limited to, static code scanning, dynamic program analysis etc. All of the details, examples and explanations that follow describe one exemplary method and system for implementing the innovative process, namely static code scanning. It is made clear, however, that the innovative process may be applied, mutatis mutandis, to other systems, configurations, architectures and implementations.

In the present, exemplary embodiment, the vulnerability scanner 130 is configured to scan for the over-privileged roles. That is, roles defined in the code that have been granted with permissions that are not limited to the minimum permissions needed for the execution of function. To this end, first the scanner 130 is configured to create a list of least-privileged roles in each serverless function developed by a developer and deployed either using the CLI tool 140 or using the console that the FaaS platform 110 provides. A least-privileged role is an entity in the cloud providers' environment that can be attached to a function and consists of a list of policies that grant least privilege permissions to specific resources with the minimum required actions.

A resource is an entity in the FaaS platform that a serverless function requires access to. An action is what the function can do with a resource. The resources and actions that the function requires access to can be deduced from the API calls and strings that are usually referenced from the function's code or from the function's configuration.

In an embodiment, a request is generated by the CLI tool 140 when a new serverless function is created or an existing serverless function is updated. Such a request is received at the scanner 130 and typically includes a path to a project containing the serverless function's code and a name (or other identifier) of the CLI tool 140. For example, for if the CLI tool 140 is a Serverless Framework, the scanner 130 is configured to search for a framework file (e.g., serverless.yml). In an embodiment, the request may also include the FaaS platform's provider name and its resource template.

In another embodiment, the request to scan the serverless function may be generated by any other means such as but not limited to: an automatic response to code or configuration changes, pre-defined periodic scan requests, a request from the serverless management console, etc.

Using the input parameters, the code of the serverless function and the resource template are retrieved and parsed by the scanner 130. Then, the scanner 130 is configured to scan the parsed information to identify least-privileged roles, i.e., combinations of minimal permissions made of services, resources and the actions that are allowed to do on each resource. A resource may be, for example, a computing resource, a storage resource, and the like located in the cloud computing platform.

A resource is designated in the serverless functions as a collection of variables gathered from different locations in the function's code and resource template. For example, a resource format may be in the following notations:

That is, the scanner may alert the developer about over-privileged roles (i.e., roles that grant permissions that are not necessary for the function to operate) that may be mistakenly programmed by the developer. For example, an over permissive role can grant unnecessary permissions (i.e., actions) on resources such as database table. Such a role may cause data to be leaked if not properly secured. The report may be provided through the CLI tool 140.

The scanning performed by the vulnerability scanner 130 to detect actions, services and resources is performed using a plurality of predefined software security analysis techniques. Such techniques can be embedded in the in the scanner 130 or retrieved from a remote location.

In another embodiment, the vulnerability scanner 130 is configured to analyze the serverless function to identify security vulnerabilities or insecure configurations in the serverless function. Here too, the scanner can be implemented in a multitude of ways on a multitude of serverless platforms and infrastructures. Examples of implementation include, but are not limited to, static code scanning, dynamic program analysis, etc. As clarified above, all of the details, examples and explanations that follow describe one exemplary method and system for implementing the innovative process, namely scanning static code. It is made clear, however, that the innovative process may be applied, mutatis mutandis, to other systems, configurations, architectures and implementations.

```
  Resource Type Notation:
  AWS::[Service]::[Resource_Type]
Examples:
    • AWS::S3::Bucket
    • AWS::DynamoDB::Table
    • AWS::ApiGateway::Account
  Resource ARN (Amazon Resource Name) format:
  arn:aws:[service]:[region]:[account_number]:[resource_type]/[resource_
  name]
  Global resources (region-less) have a different notation:
  arn:aws:[service]:::[resource_name]
Examples:
  • arn:aws:dynamodb:us-west-2:12345678:table/users
  • arn:aws:s3:::bucket_name
```

In order to identify a resource, the vulnerability scanner 130 is configured to first scan for services designated in the code. Then, for each identified service, the vulnerability scanner 130 is configured to scan for the relevant region from which the service is called.

For each service, the vulnerability scanner 130 is configured to scan for used resources in the code by fetching, from the client environment 150, all the possible resources that can be utilized. Such resources can be designated in the code (including the framework file and cloud providers' resource templates). The scanning for the pieces of information allows for building the resource in a format, such as but not limited to, the format designated above.

Finally, for each service designated in the resource, the scanner 130 is configured to scan the code for relevant actions to be performed on the detected resource. In an embodiment, for any combination of resource and action, the code is further analyzed to determine if they should be considered as least-privileged roles. For example, the roles resulted from the scanning are compared to a predefined list of roles defined for the function. If the predefined roles grant more permissions than the roles resulted from the scanning, they are declared as over-privileged roles and reported to the developer.

In the present, exemplary embodiment, the vulnerability scanner 130 is configured to detect vulnerability and other security issues in the serverless functions deployed in the FaaS platform 110. In this embodiment, an event (or any type of message or request) is sent to the scanner 130 upon deployment of a new code. Such an event may be provided by the CLI tool 140 or the client environment 150. It should be noted that an event can be sent when a new serverless function or a modified version thereof is deployed. In some embodiments, an event that triggers the vulnerability scan is sent periodically.

Upon receiving the event, a copy of the serverless function to be scanned is locally saved in the vulnerability scanner 130, which is configured to operate a number of analyzers to examine the serverless function's code. Alternatively, the serverless function may be scanned from a remote location, or by any means allowing the scanner access to the serverless function's code, configuration files and any other related software artifacts.

Specifically, in one embodiment, the scanner 130 is configured to detect known vulnerabilities (e.g. such as those published in the CVE® database) in third-party libraries such as open source libraries. The detection of vulnerabilities is performed using information provided by the intelligence systems 170.

In another embodiment, the vulnerability scanner 130 is also configured to detect overly-privileged security permissions. That is, detecting over privileged roles with over-permissions provided or not correctly enforced by the function. It should be noted that early detection of such vulnerabilities reduces the risks associated with attackers exploiting over permissive functions and accessing sensitive resources.

In yet another embodiment, the vulnerability scanner 130 is configured to scan or otherwise detect sensitive data embedded or insecurely stored in code or configurations of the serverless function in the serverless function. Sensitive data may include passwords, passcodes, personal information, API Keys, Access Keys to the cloud providers' environment, or other sensitive information that are stored in an unprotected text format.

In yet another embodiment, the vulnerability scanner 130 is configured to scan the serverless function to identify third-party services APIs in the function's code. The scanner 130 may send an alert about services known to be vulnerable. All in all, the scanner 130 is configured to detect and alert on issues that may pose cyber risks when the serverless function is executed.

In an embodiment, when a potential vulnerability is detected by scanner 130, a mitigation action can take place. Such an action includes generating an alert, stopping a deployment or an execution of the vulnerable serverless function, or automatically removing the vulnerability, and the like.

The methods performed by the vulnerability scanner 130 will be discussed in greater detail with respect to FIGS. 2 and 3.

It should be noted that the example implementation shown in FIG. 1 is described with respect to a single FaaS platform 110, merely for simplicity purposes and without limitation on the disclosed embodiments. Serverless functions that can be deployed and executed in more cloud computing platforms may be protected without departing from the scope of the disclosure. It should be further noted that the disclosed embodiments can operate using multiple vulnerability scanners 130.

Figure 2:
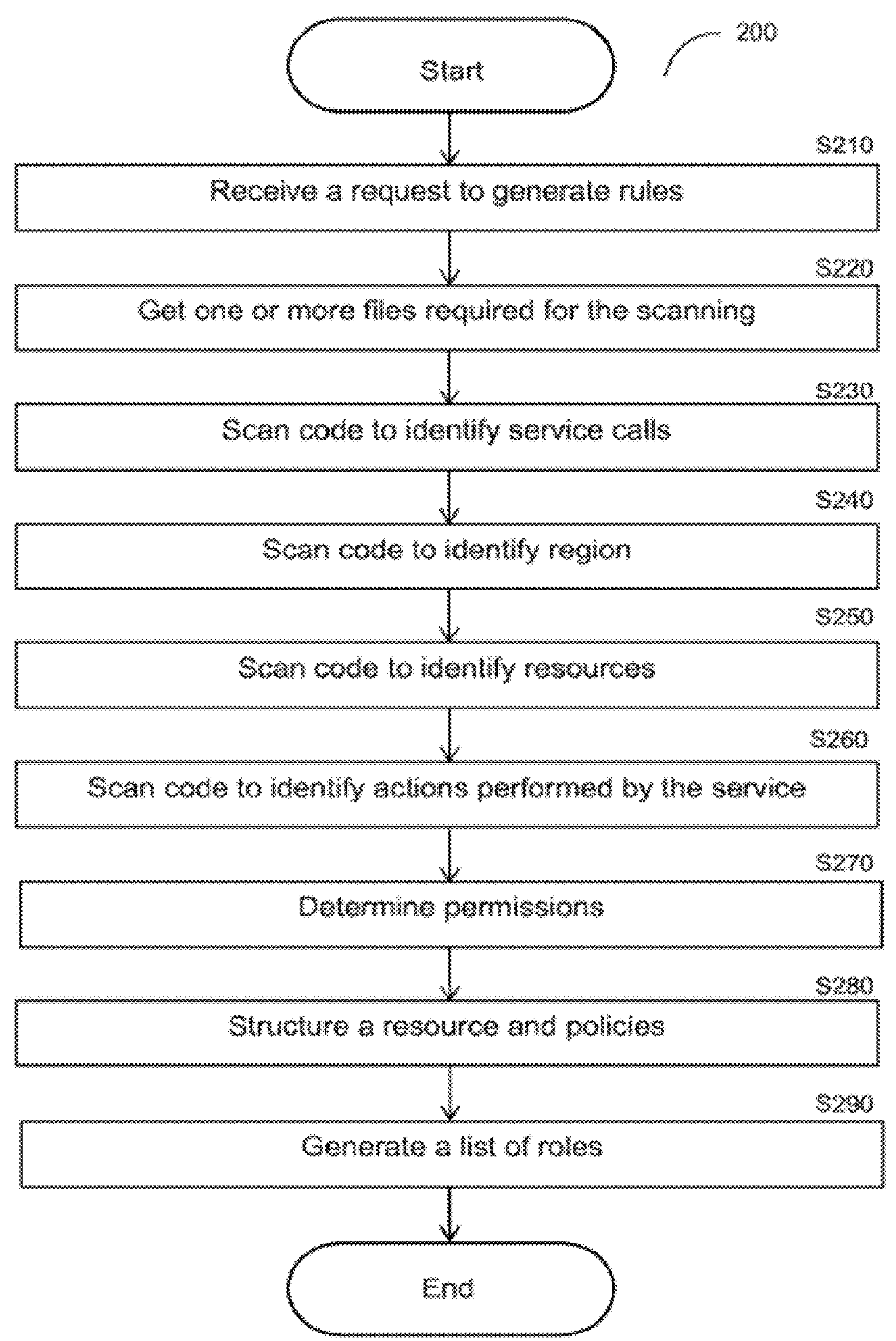
FIG. 2 is a flowchart illustrating a method for scanning for over-privileged roles defined in serverless functions according to an embodiment.

FIG. 2 shows a non-limiting flowchart 200 illustrating a method for scanning for over-privileged roles defined in serverless functions according to an embodiment. Once again it is made clear that the method disclosed hereafter is merely one exemplary implementation of the innovative process. In truth, the process can be implemented in a multitude of ways on a multitude of serverless platforms and infrastructures. Examples of implementations include, but are not limited to, static code scanning (as detailed hereafter), dynamic program analysis, etc. All of the details, examples and explanations that follow describe one exemplary method and system for implementing the innovative process, namely scanning static code. It is made clear, however, that the innovative process may be applied, mutatis mutandis, to other systems, configurations, architectures and implementations. At S210, a request to generate a list of least-privileged roles is received. In an embodiment, the request may include a path to a project that contains the serverless functions' code, a name (or other identifier) of the framework used to create the serverless function, the cloud provider name, and a location of its resource template. Hereafter are detailed steps for analyzing the serverless function to identify a strict set of security permissions required by the serverless function in order to interact with a computing environment as intended.

At S220, based on the input parameters identified in the request, at least the framework file and/or a resource's template is retrieved. Such a file defines the events that trigger the serverless function and the resources to be utilized or accessed by the function.

At S230, the serverless function's code of at least the framework file is scanned to identify all services called or accessed by the function. For example, a service in an AWS Lambda function may be defined as "boto3.client('dynamodb')" which creates a low-level service client named "DynamoDB". In this example, the scanning process searches for the string "boto3.client". In an embodiment, prior to scanning for identification of service calls, S230 includes identifying the actual parts of the code to be executed. To this end, the method searches for all the functions code files and traces the dependencies starting from the "handler" file. This allows for ignoring code files that are uploaded as part of the function files bundle, but will not be executed, and thus not granted with extra (unwanted) permissions.

At S240, for each identified service, the code is scanned to identify a region from which the service is being called. A region is a geographical region in which the cloud platform resides. For example, United States East Coast, United States West Coast, Europe, and the like. A region in a service call in a Lambda function may be defined as "boto3.client('dynamodb', region='us-west-2')". In this example, the scanning process searches for the string "boto3.client" and "region".

At S250, for each identified service, the code is scanned to identify resources defined in each service. In an embodiment, S250 also includes fetching all the possible resources from the developers' cloud environments and searching the strings related to the services. For example, a service call in an AWS Lambda function may be defined as "dynamodb.Table('Users')", where ".Table" is the resource name. In this example, the scanning process searches for the string ".Table".

At S260, for each identified service, the code is scanned to identify actions performed on the service. For example, an action of a Lambda function may be defined as "dynamodb.GetItem( . . . )", where "GetItem" is the action name. In this example, the scanning process searches for the string "GetItem". In some embodiments, the S260 includes identifying the relevant cloud provider account identification (ID), for example, an account number.

In order to generate a role, the permissions granted to the function should be identified. In general, the aim is to identify a strict set of security permissions required by the serverless function in order to interact with a computing environment as intended by the developer. To this end, at S270, configuration files are scanned to determine any permissions defined therein. The configuration file may be part of the framework file, the cloud resource template file, and/or a configuration file of the cloud providers' environment.

At S280, the various attributes identified at S230 through S260 are assembled into a data structure representing at least the identified service, region, account, and resource. An exemplary resource data structure generated using the attributes identified in the above examples may be as follows:

```
Resource Type Notation:
    AWS::[Service]::[Resource_Type]
```

-continued

```
Examples:
  • AWS::S3::Bucket
  • AWS::DynamoDB::Table
  • AWS::ApiGateway::Account
    Resource ARN (Amazon Resource Name) format :
    arn:aws:[service]:[region]:
    [account_number]:[resource_type]/[resource_name]
    Global resources (region-less) have a different notation:
    arn:aws:[service]:::[resource_name]
Examples:
  • arn:aws:dynamodb:us-west-2:12345678:table/users
  • arn:aws:s3:::bucket_name
```

At S290, one or more least-privileged roles are generated based on the identified service(s), resource(s), region(s), action(s) for each service in the hosting cloud provider. Essentially, a security policy is generated where the security policy includes a strict set of security permissions. Each least-privileged role defines a list of policies that grant least privilege permissions to a specific resource with the minimum required actions. The policy may include a definition to allow, deny, or restrict an action on a resource. In an example embodiment, the policy is compiled according to the rules of the policy language required by the cloud provider. A role may include two separate policies: a trust policy, which specifies who can assume the role, and the permissions policy, which defines what actions and resources the principal is allowed to use.

An exemplary resource least-privileged role generated using the attributes identified in the above examples may be as follows:

```
{
  "Version": "2012-10-17",
  "Statement": [
    {
      "Action": [
        "dynamodb:GetItem"
      ],
      "Effect": "Allow",
      "Resource": "arn:aws:dynamodb:us-west-
2:1111111111:table/Users"
    }
  ]
}
```

The generated roles may be reported and/or saved in a database for future usage. Alternatively or additionally, the security permissions actually granted to serverless function can be compared with the strict set of security permissions identified in S270. The next step includes generating an alert when the actual security permissions are overly privileged relative to the strict set of security permissions identified in S270. In preferred embodiments, there is provided a threshold according to which it is determined whether the actual security permissions are overly privileged relative to the strict set of security permissions. If the security permissions are less strict (i.e. more privileged) than the identified strict set by the threshold value then the security permissions are not overly privileged. If, however, the actual security permissions are more permissive than the identified strict set, then the permissions are overly privileged.

Alternatively or additionally, in some embodiments, the innovative process includes preventing building (a build) or deployment of the serverless function when the security permissions are overly privileged relative to the strict set of security permissions. Alternatively or additionally, the innovative process includes preventing or stopping execution of the serverless function when the security permissions are overly privileged relative to the strict set of security permissions.

Figure 3:
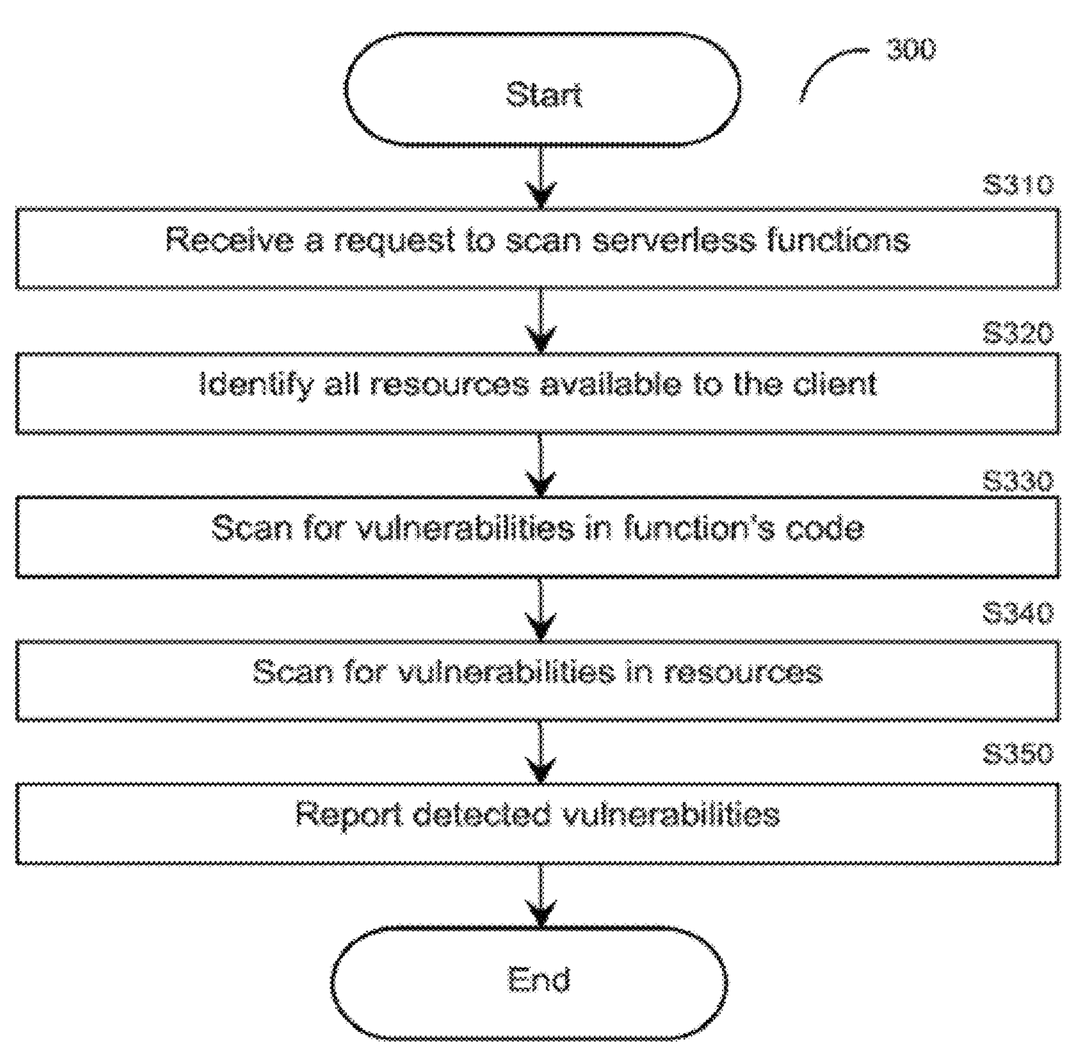
FIG. 3 is a flowchart illustrating a method for detecting potential vulnerabilities in serverless functions according to an embodiment.

FIG. 3 shows an example flowchart 300 illustrating a method for detecting potential vulnerabilities in serverless functions according to an embodiment. The method is an exemplary implementation of the innovative process for protecting a serverless function by analyzing the serverless function to identify security vulnerabilities or insecure configurations in the serverless function.

At S310, a request is received to scan for vulnerabilities in a serverless function or an application including a plurality of serverless functions, which are bundled together. The request may be received when a new serverless function is deployed in the FaaS platform or when a new update thereof has been created. The request may identify the serverless application, function, the client environment, and/or the cloud provider. In an example embodiment, the request may be locally generated.

At S320, all resources available to the client environment are identified. In addition, a local copy of the function to be scanned may be locally saved outside of the FaaS platform and/or the client environment. For example, such a function can be saved in the scanner 130 (FIG. 1) and deleted once the scanning is completed. Alternatively, the serverless application or serverless functions may be scanned from a remote location.

At S330, the code of the function is scanned to detect vulnerabilities. The scanning is aimed to detect vulnerabilities and weaknesses in serverless applications, such as but not limited to: vulnerabilities in third-party libraries, embedded secrets, over privileged roles, weak encryption, improper exception handling, potential data leakage sources, insecure third-party service usage, and can also be utilized to detect functions determined as "protected functions," etc.

Specifically, to detect vulnerabilities in third-party libraries, known vulnerability or CVE data is retrieved from intelligence systems (e.g., systems 170). In one exemplary implementation, first, a name and version of each third-party library in the code is detected based on their hash values or from the library manifest file. One or more regular expressions can be utilized to this end. Then, it is checked if there is any known vulnerability or CVE associated with each identified library. Finally, a score is assigned to each detected vulnerability in an identified library. In an example embodiment, a higher score is assigned to vulnerabilities (CVEs) detected in services to which the function has access. For example, if an SQL injection vulnerability was found in one of the libraries, the relevant permissions to an SQL database are determined, and a higher score is assigned to such a vulnerability.

In another embodiment, at S330 secrets are detected. Such secrets include text secrets, passwords to services, access keys and improper encryption usages. The scanning is performed in the code and environment variables or configuration files using any scanning methods such as searching for specific regular expressions (e.g. "password")

In another embodiment, S330 includes scanning for over-privileged roles. That is, roles defined in the code that have been granted with permissions that are not limited to the minimum permissions needed for the execution of function. S330 may result in a list of over permissive roles that allow access to unused services, unused resources, and/or unused actions. An example process for scanning for over privileged roles is provided in FIG. 2 above.

In another embodiment, S330 includes scanning for exception handling. In an exemplary embodiment, abstract syntax trees (ASTs) in the code are identified and analyzed to detect potential exceptions that can be raised and are not handled. For each detected AST the scanning tries to identify, e.g. using regular expression patterns, an exception handling block in the beginning of the tree. Following is a non-limiting example for an exception handling block:

```
"try:
  [code to execute when no exception was raised]
except Exception, e:
  [code to execute when an exception was raised]"
```

In yet another embodiment, S330 includes detecting potential sources for data leakage. To this end, possible outputs of the function are traced and checked if unwanted types of data can be returned. For example, exception as a returned value may be considered as a potential source for data leakage.

In yet another embodiment, S330 includes identifying usage of third-party services. For each such service, its reputation is determined using, for example, external resources, such as but not limited to, the intelligence systems 170. Services that are not reputable are considered unsafe.

At S340, resources available at the client environment are scanned for misconfigurations. This includes misconfigurations related to the configurations of the function, or other related resources, such as API Gateways, IAM roles, and the like. In an embodiment, S340 also includes misconfigurations that unmet security best practices defined by the FaaS platform are detected. For example, two or more AWS Lambda functions defined using the same IAM role are deemed to be not a secure best practice.

It should be noted that only some of the scanning techniques described above can be performed. Further, the scanning techniques can be performed in parallel in a different order than the order discussed above.

At S350, any detected vulnerability is reported. In some embodiments, a mitigation action is performed upon detection of at least one vulnerability. The mitigation may be triggered based on the severity of the detected vulnerability or a security policy. A mitigation action may include generating an alert and/or preventing building and/or deployment and/or preventing or stopping execution of the serverless function, or automatically fixing the vulnerability or weakness.

The various disclosed embodiments have described herein with reference to examples from AWS environments, and in particular AWS Lambda serverless functions. However, it should be appreciated that the disclosed embodiments are not limited to such environments only. Specifically, the embodiments disclosed herein can be utilized in other FaaS environments, examples of which are provided above.

In summary, the innovative process includes analyzing the serverless function to identify a strict set of security permissions required by the serverless function in order to interact with a computing environment as intended. A security policy can be generated with the strict set of permissions. This policy can be implemented/applied, manually or automatically, as the security policy for the serverless function. Alternatively, the strict set of security permissions can be compared to the existing set of permissions. As a result of the comparison, an alert can be generated when the existing set of permissions is overly permissive or privileged relative to the strict set. Alternatively or additionally, a build or deployment of the serverless function can be blocked or prevented if the existing security permissions are overly privileged. In other embodiments, execution of the serverless function can be prevented or the continued execution of the function can be stopped if the existing security permissions are overly privileged.

In another embodiment, the innovative process includes analyzing the serverless function to identify security vulnerabilities or insecure configurations in the serverless function. An alert can be generated when the security vulnerabilities or insecure configurations are identified in the serverless function. Alternatively or additionally, a build or deployment of the serverless function can be prevented in the aforementioned situation. In still another alternative or additional embodiment, execution of the serverless function can be prevented when the security vulnerabilities or insecure configurations are identified in the serverless. If execution has begun, the continues execution of the function can be stopped.

Figure 4:
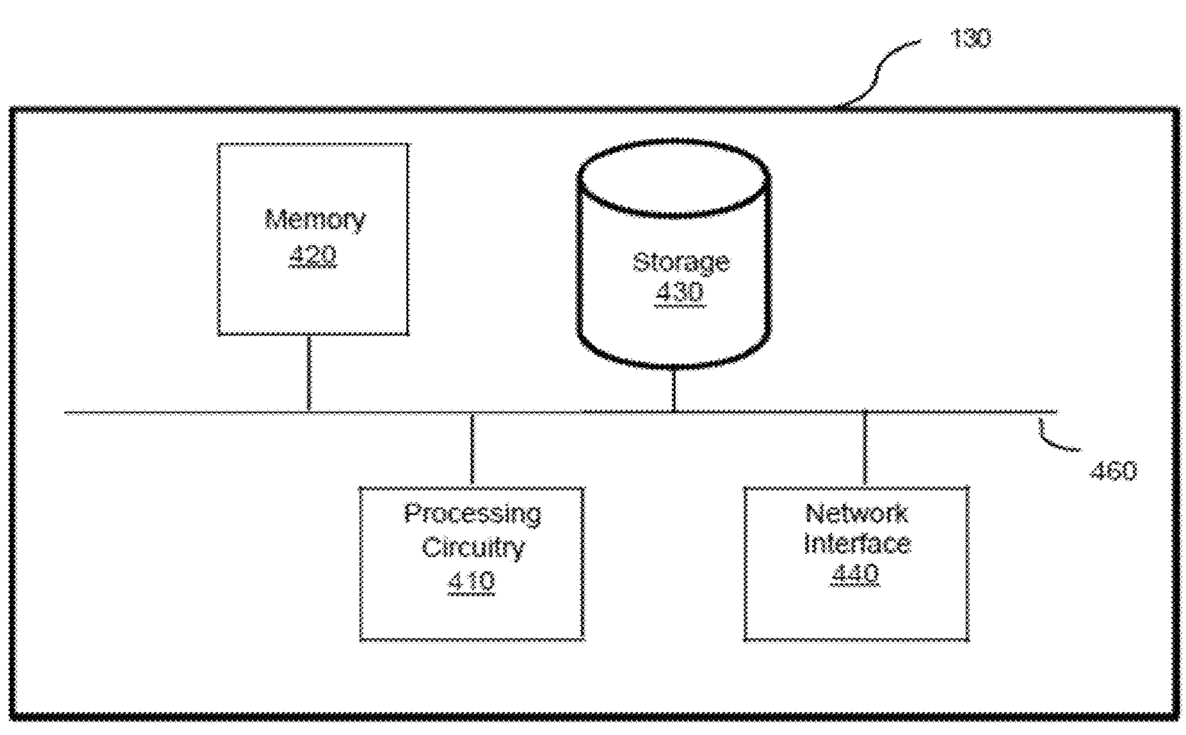
FIG. 4 is an example block diagram of the vulnerability scanner according to an embodiment.

FIG. 4 is an example block diagram of the vulnerability scanner 130 according to an embodiment. The vulnerability scanner 130 includes a processing circuitry 410 coupled to a memory 420, a storage 430, and a network interface 440. In an embodiment, the components of the vulnerability scanner 130 may be communicatively connected via a bus 460.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof. In one configuration, computer readable instructions to implement one or more embodiments disclosed herein may be stored in the storage 430.

In another embodiment, the memory 420 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various processes described herein. Specifically, the instructions, when executed, cause the processing circuitry 410 to determine over-privileged roles vulnerabilities in serverless functions.

The storage 430 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 430 may store communication consumption patterns associated with one or more communications devices.

The network interface 440 allows the vulnerability scanner 130 to communicate with the external systems, such as the CLI tools, the cloud provider platforms, and the intelligence system.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method comprising:

analyzing one or more serverless functions for at least one of vulnerabilities and insecure configurations, wherein analyzing the one or more serverless functions comprises, based on receiving a request to scan the one or more serverless functions, scanning the one or more serverless functions for at least one of vulnerabilities and insecure configurations and scanning one or more resources related to the one or more serverless functions for misconfigurations;

detecting at least one of a vulnerability and an insecure configuration in at least one of a first of the one or more serverless functions and in a first of the one or more resources related to the one or more serverless functions based on scanning the one or more serverless functions and the one or more resources; and reporting the at least one of the vulnerability and the insecure configuration in the first serverless function and/or the misconfiguration in the first resource.

2. The method of claim 1, wherein scanning the one or more serverless functions comprises obtaining a copy of each of the one or more serverless functions and scanning the copy of each of the one or more serverless functions or scanning the one or more serverless functions remotely.

3. The method of claim 1, wherein the at least one of the vulnerability and the insecure configuration comprises sensitive data insecurely stored in at least one of code and a configuration of the first serverless function.

4. The method of claim 1, wherein at least one of the vulnerability and the insecure configuration comprise at least one of known vulnerabilities in third-party libraries, an overprivileged role, weak encryption, improper exception handling, a potential data leakage source, and usage of an insecure third-party service.

5. The method of claim 1, further comprising preventing building or deployment of the first serverless function based on detecting at least one of the vulnerability and the insecure configuration of the first serverless function.

6. The method of claim 1, further comprising preventing or stopping execution of the first serverless function based on detecting at least one of the vulnerability and the insecure configuration of the first serverless function.

7. The method of claim 1, wherein the request indicates at least one of the one or more serverless functions, an application that comprises the one or more serverless functions, and a cloud provider with which the one or more serverless functions are associated.

8. The method of claim 1, wherein analyzing the one or more serverless functions is triggered based on deployment of the one or more serverless functions or based on an update to the one or more serverless functions.

9. One or more non-transitory machine-readable media having program code for analyzing a serverless function stored thereon, the program code comprising instructions to:

based on receipt of a request that indicates the serverless function, scan the serverless function and one or more resources related to the serverless function, wherein the instructions to scan the serverless function comprise instructions to scan the serverless function to detect at least one of vulnerabilities and insecure configurations of the serverless function, wherein the instructions to scan the one or more resources related to the serverless function comprise instructions to scan the one or more resources to detect misconfigurations of the one or more resources;

detect at least one of a vulnerability and an insecure configuration of the serverless function and/or a misconfiguration of a first of the one or more resources based on the scan of the serverless function and the scan of the one or more resources; and report the at least one of the vulnerability and the insecure configuration of the serverless function and/or the misconfiguration of the first resource related to the serverless function.

10. The non-transitory machine-readable media of claim 9, wherein the instructions to scan the serverless function comprise instructions to obtain a copy of the serverless function and scan the copy of the serverless function or instructions to scan the serverless function remotely.

11. The non-transitory machine-readable media of claim 9, wherein the program code further comprises instructions to prevent building or deployment of the serverless function based on detection of at least one of the vulnerability and the insecure configuration of the serverless function.

12. The non-transitory machine-readable media of claim 9, wherein the program code further comprises instructions to prevent or stop execution of the serverless function based on detection of at least one of the vulnerability and the insecure configuration of the serverless function.

13. The non-transitory machine-readable media of claim 9, wherein the at least one of the vulnerability and the insecure configuration comprises at least one of sensitive data insecurely stored in at least one of code and a configuration of the serverless function, known vulnerabilities in third-party libraries, an overprivileged role, weak encryption, improper exception handling, a potential data leakage source, and usage of an insecure third-party service.

14. An apparatus comprising:

a processor; and a machine-readable medium having instructions stored thereon that are executable by the processor to cause the apparatus to, based on receipt of a request to scan one or more serverless functions, scan the one or more serverless functions for at least one of vulnerabilities and insecure configurations and scan one or more resources related to the one or more serverless functions for misconfigurations;

detect at least one of a vulnerability and an insecure configuration of a first serverless function of the one or more serverless functions and/or a misconfiguration of a first of the one or more resources related to the one or more serverless functions based on the scan of the one or more serverless functions and the scan of the one or more resources; and report the at least one of the vulnerability and the insecure configuration of the first serverless function and/or the misconfiguration of the first resource.

15. The apparatus of claim 14, wherein the instructions executable by the processor to cause the apparatus to scan the one or more serverless functions comprise instructions executable by the processor to cause the apparatus to obtain a copy of each of the one or more serverless functions and scan the copy of each of the one or more serverless functions or instructions executable by the processor to cause the apparatus to scan the one or more serverless functions remotely.

16. The apparatus of claim 14, further comprising instructions executable by the processor to cause the apparatus to prevent building or deployment of the first serverless function based on detection of at least one of the vulnerability and the insecure configuration of the first serverless function.

17. The apparatus of claim 14, further comprising instructions executable by the processor to cause the apparatus to prevent or stop execution of the first serverless function based on detection of at least one of the vulnerability and the insecure configuration of the first serverless function.

18. The apparatus of claim 14, wherein the receipt of the request to scan the one or more serverless functions is based on deployment of or update to of the one or more serverless functions.

19. The apparatus of claim 14, wherein the request indicates at least one of the one or more serverless functions, an application that comprises the one or more serverless functions, and a cloud provider with which the one or more serverless functions are associated.

20. The apparatus of claim 14, wherein the at least one of the vulnerability and the insecure configuration comprises at least one of sensitive data insecurely stored in at least one of code and a configuration of the first serverless function, known vulnerabilities in third-party libraries, an overprivileged role, weak encryption, improper exception handling, a potential data leakage source, and usage of an insecure third-party service.

* * * * *